Aug. 31, 1965 J. LESZCZYNSKI 3,204,203

TRANSISTORIZED MODULATORS

Filed Jan. 10, 1962 2 Sheets-Sheet 1

Aug. 31, 1965 J. LESZCZYNSKI 3,204,203

TRANSISTORIZED MODULATORS

Filed Jan. 10, 1962 2 Sheets-Sheet 2

United States Patent Office 3,204,203

Patented Aug. 31, 1965

3,204,203

TRANSISTORIZED MODULATORS

Jan Leszczynski, Little Chalfont, England, assignor to The Plessey Company Limited, Ilford, England, a British company Filed Jan. 10, 1962, Ser. No. 165,457
Claims priority, application Great Britain, Jan. 12, 1961, 1,366/61
6 Claims. (Cl. 332—31)

Figure 1:
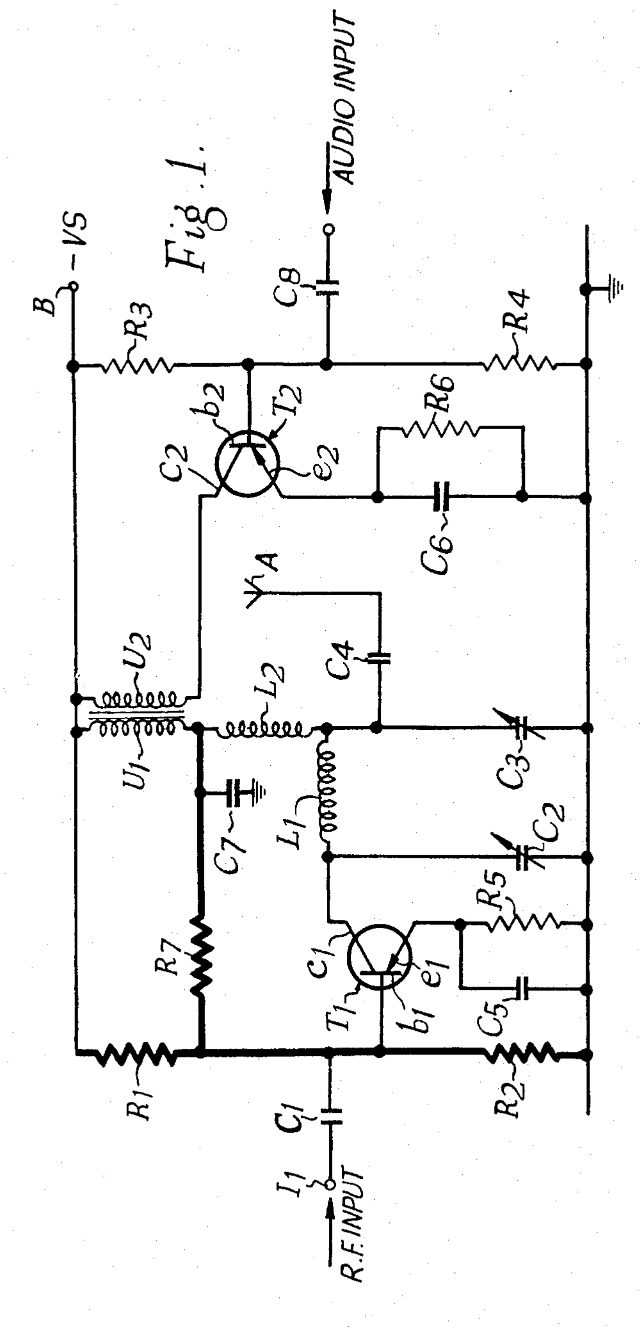

This invention relates to amplitude-modulated transmitter circuits in which a transistor is used in the modulated stage. It has for an object to provide an improved transistorized transmitter circuit in which a high degree of substantially proportional amplitude modulation can be applied to a carrier waveform.

According to the present invention voltages proportional to the modulation waveform are applied, addition to the usual D.-C. bias, between the emitter and both the base and the collector of a transistor employed to amplify the carrier waveform, said transistor being biased to operate in the class-A range of its characteristic.

Assuming that the carrier oscillation extends over substantially the full class-A range (linear-amplification range), the application of the modulating voltage to the base would alter the gradient of the characteristic and thus the amplification, but cut-off would occur at the amplitude maximum relative to the maximum of the supply voltage. The present invention avoids this cut-off and, therefore, preserves proportionality of the modulation due to the fact that the collector voltage is also modulated by a voltage proportional to the base voltage modulation, thereby permitting a considerably increased power of proportional-modulation output to be obtained from the transistor.

In the drawings accompanying the specification

Figure 2:
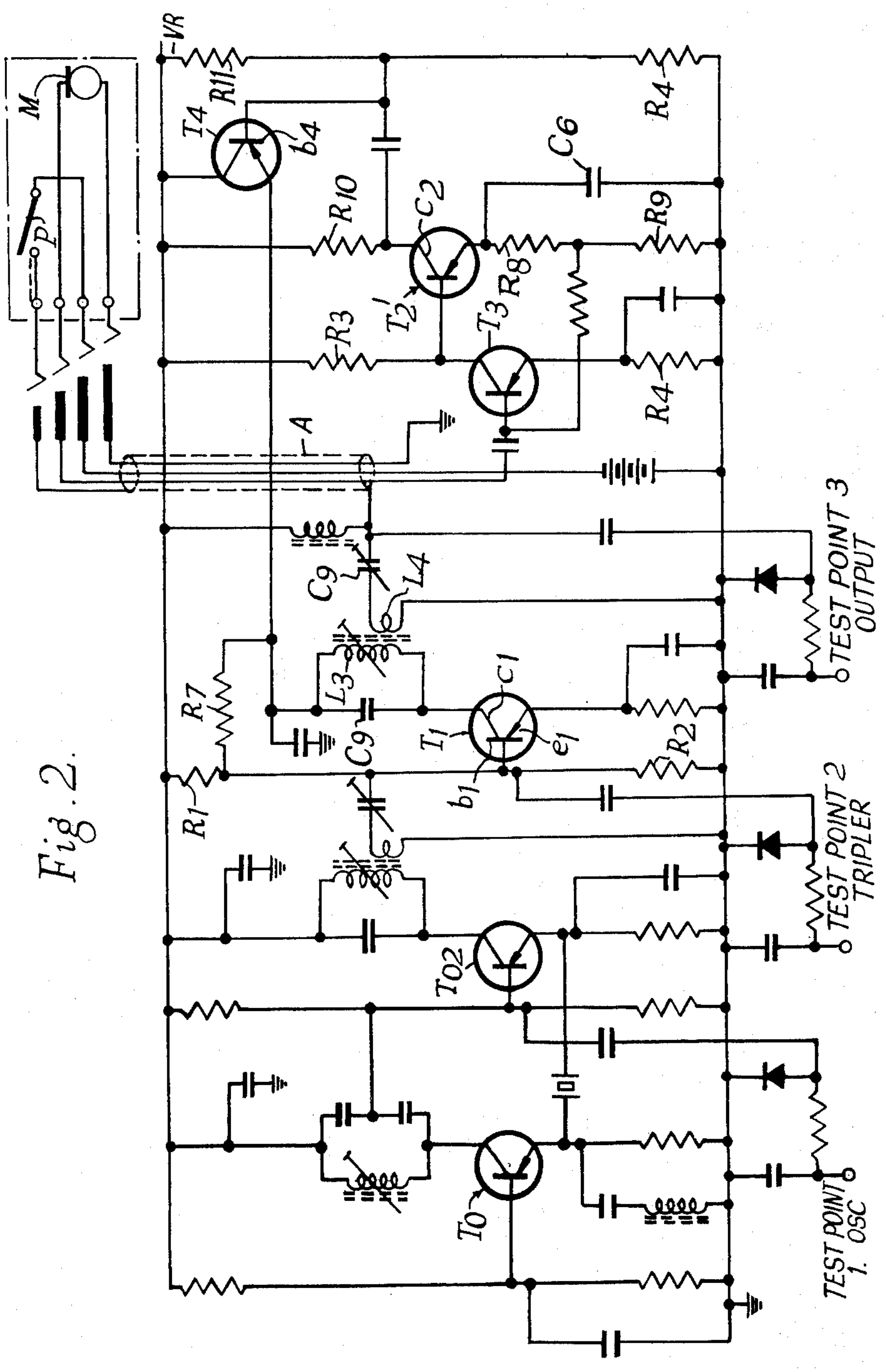

FIGURE 1 is one form of simple modulator circuit incorporating the invention, and FIGURE 2 is a modified circuit providing improved protection for the modulating transistor.

Referring now first to FIGURE 1, the radio-frequency carrier input is applied to a terminal 1, and thus through a condenser C1 between the base *b*1 and the emitter *e*1 of a transistor T1 hereinafter referred to as the modulated transistor, while the collector *c*1 of the modulated transistor is coupled to antenna A via a $\pi$ (-shape) network comprising an inductance coil L1 and tuning condensers C2 and C3 and a coupling condenser C4. A suitable constant negative supply voltage —VS is applied to the collector C1 from terminal B via a winding U1 of a transformer U1, U2, a radio-frequency choke L2 and the inductance coil L1, and a lower negative bias voltage, derived from the voltage —VS by a resistor network R1 and R2, is applied to the base *b*1, causing the transistor T1 to operate in class-A range. The negative supply voltage —VS is also applied, via the other winding U2 of the transformers U1, U2 to the collector *c*2 of a second transistor T2, and a smaller negative bias voltage derived from it by resistor network R3, R4 is applied to the base *b*2 of this second transistor. The emitters *e*1 and *e*2 of the transistors T1 and T2 are grounded through resistors R5 and R6 respectively which, are bypassed for radio-frequency by condensers C5 and C6 respectively. That end of transformer winding U1 which is connected to the RF choke L2 and thus isolated, as regards radio-frequencies, from the connector 1, and is grounded to radio-frequencies by the condenser C7 and is connected to the base *b*1 of transistor T1 via a resistor R7. In order to modulate the RF output of transistor T1 which reaches the antenna A, the modulating audio input is applied, through a condenser C8, to the base *b*2 of the second transistor T2 thus causing the transistor T2 to supply transformer winding U2 with amplified audio energy. The resultant audio frequency modulation voltage output of transformer winding U1 is applied via the choke L2 and the inductance coil L1 to the collector *c*1 and via the divider network R2, R7 to the base *b*1 of the modulated transistor T1. (The condenser C7, while offering little resistance to radio-frequency voltages, is of so small capacitance that it constitutes a conderable impedance to the audio-frequency modulation voltage developed.) Resistor R1 has a substantially higher, for example 20 times higher, value than the resistor R2, so that only a small fraction of the current flowing through R7 will be diverted from resistor R2 by the resistor R1.

FIGURE 2, in which the same references as in FIGURE 1 have been used to designate corresponding parts, illustrates a more complete circuit of a practical layout, of which however only the parts relevant for the present invention shall be described in detail. An oscillator providing the radio-frequency carrier input, includes two transistors T0 and T02, and an audio-frequency signal generator includes a microphone M which is rendered operative by a press key P, and the output of which is amplified by a transistor T3 before reaching the amplifier stage T2′ of which the output is utilized to modulate the transistor T1 which is fed with radio-frequency currents from the said oscillator. While however, in the embodiment of FIGURE 1 a transformer (windings U1, U2) is interposed between transistors T2 and T1, the collector of transistor T2′ is supplied through resistor R10, and the audio-frequency voltage developed across this resistor is applied to the base *b*4 of a further transistor T4 whose emitter output is utilized to vary the base-bias and collector voltages of transistor T1 using voltage divider networks R1, R7, R2. In this circuit the transistor T4 acts as a modulating transistor and as a voltage limiter preventing damage to the transistor T1 if excess currents or voltages are produced in the microphone circuit.

The circuits described may be modified in detail within the scope of the invention. Thus instead of using a resistive voltage divider, a reactive voltage divider may be substituted in a manner well known to those skilled in the art.

I claim:

1. An amplitude modulated radio-frequency transmitter circuit, comprising a transistor having a base, an emitter, and a collector, a D.C. power input line, a first and a second impedance member connected in series to form a voltage divider network, the first impedance member interconnecting said line and the base, and the second impedance member interconnecting the base and emitter, means for applying an R.F. voltage of constant frequency between the base and the emitter, a tunable circuit connected to the emitter and collector, an audio-frequency voltage-divider network comprising said second impedance member and an audio-frequency impedance member interconnecting the base and collector of the transistor, R.F. isolating means being interposed between the collector and said audio-frequency impedance member, and means for applying an audio-frequency modulating voltage waveform between the emitter and the junction of said audio-frequency impedance member with said radio-frequency isolating means.

2. Apparatus as claimed in claim 1, wherein said first and second impedance members and said audio-frequency impedance member are resistors.

3. Apparatus as claimed in claim 1, including three resistors, each having one end connected to the base of the transistor said resistors being connected to respectively constitute said first and second impedance members and said audio-frequency impedance member, and means for applying the audio-frequency modulating voltage waveform between the other ends of the resistors respectively constituting the first impedance member and the audio-frequency impedance member.

4. Apparatus as claimed in claim 3, including an A.F. transformer having a primary and a secondary winding, the secondary winding being interconnected between said other ends of the resistors respectively constituting the first impedance member and the audio-frequency impedance member, and means for applying the audio-frequency modulating voltage waveform to the primary winding.

5. Apparatus as claimed in claim 3, including a further transistor having a control circuit and output terminals, said output terminals being respectively connected to said other ends of the resistors respectively constituting the first impedance member and the audio-frequency impedance member, and means for applying the A.F. modulating voltage waveform to said control circuit.

6. An amplitude-modulated radio-frequency transmitter circuit comprising a transistor having a base, an emitter, and a collector, means for applying to the collector a constant supply voltage relative to the emitter and to the base a constant bias voltage, lower than said supply voltage, relative to the emitter, means for applying to the base relative to the emitter an R.F. voltage waveform of constant amplitude and frequency superimposed upon said bias voltage and of such magnitude as to extend over at least the greater part of the class-A range of the said transistor as thus biased, amplifier means having an input for application thereto of an audio-frequency modulating waveform, an audio-frequency voltage divider network fed by said amplifier and means for applying the output voltage of said amplifier means to the collector of said transistor relative to the emitter, superimposing it upon said supply voltage, and for applying a portion of said output voltage to the base of said transistor relative to the emitter, superimposing it upon said bias and said radio-frequency voltage waveform.

References Cited by the Examiner

UNITED STATES PATENTS

| | | | |
|---|---|---|---|
| 2,713,665 | 7/55 | Raisbeck et al. | 332—31 |
| 3,050,642 | 8/62 | Rogers et al. | 307—88.5 |

ROY LAKE, *Primary Examiner.*

JOHN KOMINSKI, *Examiner.*